Sept. 25, 1962 E. R. McCARTER 3,056,077
SYNCHRONIZED POWER SYSTEM
Filed Sept. 3, 1959
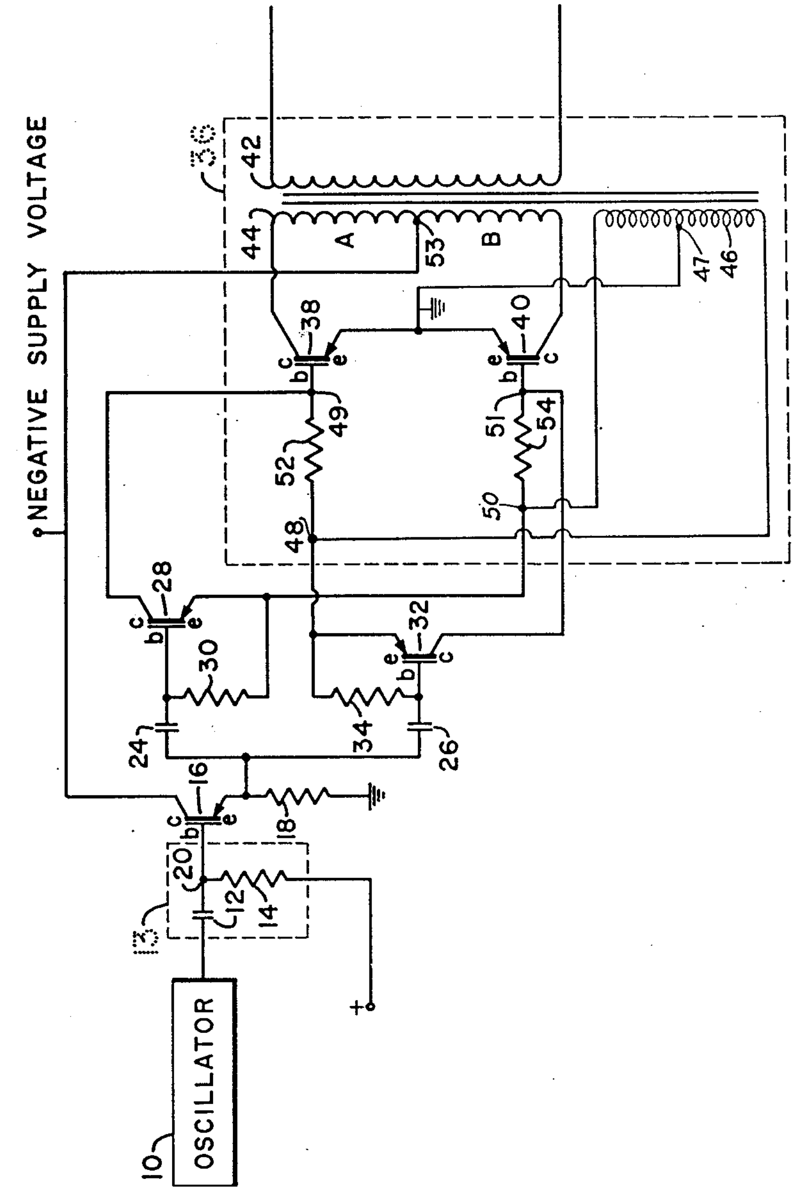
Ed R. McCarter Inventor
By John D. Gassett Attorney United States Patent Office 3,056,077
Patented Sept. 25, 1962

3,056,077
SYNCHRONIZED POWER SYSTEM

Ed R. McCarter, Tulsa, Okla., assignor to Jersey Production Research Company, a corporation of Delaware Filed Sept. 3, 1959, Ser. No. 837,967
3 Claims. (Cl. 321—45)

This invention relates to a frequency synchronized electrical power system. It relates more particularly to a frequency synchronized electrical transistor power system capable of delivering large power.

The present invention is useful in a number of applications where it is required that a large power source have a frequency synchronized with a reference frequency. It is especially useful in driving circuits for rotating drums carrying magnetic recording medium upon which is recorded seismic signals to insure that the drum is always rotated at a known and essentially uniform speed. This is needed for correlation of signals.

Briefly the invention includes a multivibrator having electronic valves connected in a push-pull relationship and two synchronizing transistors arranged to alternately turn the two electronic valves of the multivibrator on and off in accordance to which of the two synchronizing transistors is conducting. A source of oscillating energy to which the multivibrator is to be synchronized is provided. Means are provided for alternately rendering the synchronizing transistors conductive in accordance with the oscillating signal.

A complete understanding of this invention may be had from the following description taken in conjunction with the drawing in which:

The FIGURE shows a circuit diagram illustrating this invention.

Oscillator 10 is a type that puts out a constant predetermined frequency square wave electrical signal alternating between positive and negative pulses. For example, oscillator 10 may be a precision fork-type oscillator. The output signal from oscillator 10 is connected electrically to the differentiator circuit 13 which includes capacitor 12 and resistor 14. The signal from junction 20 of the differentiator circuit is electrically connected to the base of transistor 16.

Transistor 16 and the other transistors in the circuit are preferably a PNP type. In the drawing, the emitter of each transistor is indicated by "*e*," the collector is designated by "*c*," and the base by "*b*." Transistor 16 is biased to a positive voltage and will conduct only when the voltage at the base of the transistor is negative. This occurs for each negative pulse from differentiator circuit 13. Positive pulses from the differentiator circuit 13 only renders the base of transistor 16 more positive and the transistor therefore does not conduct.

The collector of transistor 16 is electrically connected to a negative voltage supply. The voltage of this negative supply is not critical and may be any voltage available which fits into the over-all system. For example, if this invention were used in connection with the equipment mounted on a motor vehicle, the voltage might be a negative twelve volts.

The emitter side of transistor 16 is electrically connected to emitter resistor 18 which is grounded. The emitter of transistor 16 is also connected to coupling capacitors 24 and 26. Capacitor 24 is electrically connected to the base of transistor 28. The emitter side of transistor 28 is electrically connected through leakage resistor 30 to the base of transistor 28. Capacitor 26 is electrically connected to the base of transistor 32. The base of transistor 32 is electrically connected through base leakage resistor 34 to the emitter of transistor 32.

A multivibrator circuit 36 is indicated within the dotted lines. Multivibrator circuit 36 includes transistors 38 and 40 in a push-pull arrangement. The transformer in this multivibrator circuit has three windings; they include output winding 42, primary winding 44 and feedback winding 46. The multivibrator circuit shown in the dotted lines 36 is a push-pull type; that is, when junction 48 at one end of feedback winding 46 is negative, transistor 38 is conductive; and when junction 50 at the other end of feedback winding 46 is negative, transistor 40 is conductive. When junction 48 is positive, transistor 38 is rendered nonconductive and likewise when junction 50 is positive, transistor 40 is rendered nonconductive. The voltage polarity in junctions 48 and 50 are always opposite.

The collector side of transistor 28 is electrically connected to junction 49 which is connected to the base of transistor 38. The collector side of transistor 32 is electrically connected to junction 51 at the base of transistor 40.

The emitter side of transistor 28 is electrically connected to junction 50 at one end of feedback winding 46. The emitter side of transistor 32 is electrically connected to junction 48 at the other end of feedback winding 46 from junction 50. Resistor 52 is in the circuit between the base of transistor 38 and junction 48 and serves as a load resistance for transistor 28. Likewise resistor 54 is in a circuit between the base of transistor 40 and junction 50 and it serves as a load resistance for transistor 32. The emitter sides of transistors 38 and 40 are connected to ground, as is also the center point 47 of feedback winding 46. The supply voltage is connected to junction 53 of primary winding 44.

In the operation of this circuit the frequency of oscillator 10 is selected to be twice that of the desired frequency of the power output from output winding 42. Differentiator 13 takes a signal from oscillator 10 and shapes it into alternate positive and negative pulses. The output pulses from differentiator circuit 13 is then fed to the base of transistor 16. As the collector side of transistor 16 is always negative, transistor 16 is rendered conductive upon receiving a negative pulse from differentiator circuit 13. When transistor 16 is thus conductive, a negative voltage is fed to the base of each of synchronizing transistors 28 and 32. Whether transistor 28 or 32 is rendered conductive by receiving the negative pulse is determined by whether junction 49 or 51 of multivibrator is negative at that particular point as the collector of transistor 28 is connected to junction 49 and the collector of transistor 32 is connected to junction 51. If multivibrator 36 were free running, that is not acted upon by synchronizing transistors 28 and 32, junctions 48 and 50 as well as 49 and 51 would alternate between being positive and negative. The natural frequency of the multivibrator circuit 36 must be lower than the desired frequency output in order to permit the switching action of synchronizing transistors 28 and 32.

To illustrate the switching let it be assumed that junction 48 is negative, then the first negative pulse fed to synchronizing transistors 28 and 32 permit transistor 28 to conduct inasmuch as the base and collector side of the transistor 28 are at that instant negative. As transistor 28 is conductive, there is a short circuit between junctions 50 and 49. This renders the base of transistor 38 positive thus turning off transistor 38. This causes the multivibrator to switch; that is, to render transistor 40 conductive.

When transistor 40 is conducting, junction 51 is negative; then, the first negative pulse passing to transistors 28 and 32 allows transistor 32 to conduct (transistor 28 will not conduct as junction 49 is positive and is connected to the collector of transistor 28), thus establishing a short-circuit between junctions 48 and 51 thus cutting off transistor 40 and turning on transistor 38. It is thus seen that the natural frequency of transistors 38 and 40 must be such that they would normally stay on or conduct longer than the time between the negative pulses of the synchronizing frequency in order to permit switching action by the synchronizing transistors 28 and 32. It is also seen that the frequency of oscillator 10 must be twice that which is desired as it takes two negative pulses from oscillator 10 to make one cycle in the multivibrator.

As shown, the supply of voltage is connected to the primary winding 44 at 53. When transistor 38 is conducting, current flows from ground through transistor 38, the upper half A of primary winding 44 to the supply voltage. When transistor 40 is conducting, current flows from ground through transistor 40, the lower half B of primary winding 44 then to the supply voltage. Any desired voltage may be obtained by the proper number of turns on output windings of the transformer. Electrical power of a synchronized frequency is taken from this system from the output windings of the transformer. This system permits large power of a synchronized frequency to be taken from the output windings instantaneously with the starting of the multivibrator and the oscillator.

While there has been described herein what is at present considered the preferred embodiment of the invention, it will be apparent that various changes and modifications may be made therein without departing from the scope of the invention.

I claim:

1. A frequency synchronized power system comprising oscillator means having negative pulses of a selected frequency; a first synchronizing transistor and a second synchronizing transistor whose bases are electrically connected to the output of said oscillator source; a multivibrator having a first switching transistor, a second switching transistor and a transformer having a feedback winding, a primary winding having a center tap and an output winding; a source of direct current connected to the center tap of said primary winding; each end of said feedback winding being electrically connected to the base of one of said switching transistors; means electrically grounding the emitter sides of said switching transistors, means electrically connecting the collector of said first switching transistor to one end of said primary winding and the collector of said second switching transistor to the opposite end of said primary winding, means electrically connecting the collector of said first synchronizing transistor with the base of said first switching transistor and the emitter side of said first synchronizing transistor with the end of said feedback winding opposite said first switching transistor; and means electrically connecting the collector side of said second synchronizing transistor with the base of said second switching transistor and means electrically connecting the emitter side of second synchronizing transistor with the end of said feedback winding opposite said second switching transistor.

2. A system for synchronizing the frequency of the output of a multivibrator with a reference signal having a series of negative pulses; the natural frequency of said vibrator being less than the frequency of the negative pulses of the reference signal, said multivibrator having a first switching transistor and a second switching transistor, a source of direct voltage supply, a transformer having its primary winding center tap connected to said source of direct voltage supply and its feedback winding electrically connected to the bases of said switching transistors, the collectors of said first and said second switching transistors being electrically connected to opposite ends of the primary winding of the transformer; all in combination with a first synchronizing transistor and a second synchronizing transistor, each said synchronizing transistor having an emitter, a base and a collector; means electrically connecting the base of each said synchronizing transistor with said negative pulse signals; means electrically connecting the collector of said first synchronizing transistor with the base of said first switching transistor and the emitter of said first synchronizing transistor with the end of said feedback winding opposite said first switching transistor; and means electrically connecting the collector side of second synchronizing transistor with the base of said second switching transistor and the means connecting the emitter side of said second synchronizing transistor with the end of said feedback winding opposite said second switching transistor.

3. A frequency synchronized power supply system comprising a multivibrator having an output transformer having an output winding, a primary winding, and a feedback winding and whose primary winding has a center tap and also having two transistors with each said transistor having a base, a collector and an emitter; means electrically connecting the collector of one of said transistors to one end of said primary winding and the collector of the other of said transistors to the opposite end of said primary winding, the emitters of said transistors being ground; an oscillator source means having pulses of a preselected frequency; means electrically connecting one end of said feedback winding to the base of one of said transistors and the opposite end of said feedback winding to the base of the other of said transistors; a first synchronizing transistor and a second synchronizing transistor; each of said synchronizing transistors being electrically connected at its base to the output of said oscillator means, the collector of the first synchronizing transistor and the emitter of the second synchronizing transistor electrically connected to the base of one transistor in said multivibrator, the emitter of the first synchronizing transistor and the collector of the second synchronizing transistor electrically connected to the base of the other transistor in said multivibrator; and a direct current voltage supply electrically connected to the center tap of the output transformer of said multivibrator.

References Cited in the file of this patent

UNITED STATES PATENTS

| | | |
|---|---|---|
| 2,788,493 | Zawels | Apr. 9, 1957 |
| 2,821,639 | Bright et al. | Jan. 28, 1958 |
| 2,953,735 | Schmidt | Sept. 20, 1960 |